United States Patent
Lee et al.

(10) Patent No.: US 10,805,860 B2
(45) Date of Patent: Oct. 13, 2020

(54) METHOD AND DEVICE FOR PERFORMING ACCESS BARRING CHECK

(71) Applicant: LG ELECTRONICS INC., Seoul (KR)

(72) Inventors: Youngdae Lee, Seoul (KR); Jaehyun Kim, Seoul (KR); Bokyung Byun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/606,208

(22) PCT Filed: Mar. 19, 2018

(86) PCT No.: PCT/KR2018/003173
§ 371 (c)(1),
(2) Date: Oct. 17, 2019

(87) PCT Pub. No.: WO2018/194270
PCT Pub. Date: Oct. 25, 2018

(65) Prior Publication Data
US 2020/0137664 A1    Apr. 30, 2020

Related U.S. Application Data

(60) Provisional application No. 62/486,943, filed on Apr. 18, 2017.

(51) Int. Cl.
*H04W 4/00* (2018.01)
*H04W 48/02* (2009.01)
*H04W 76/27* (2018.01)

(52) U.S. Cl.
CPC .......... *H04W 48/02* (2013.01); *H04W 76/27* (2018.02)

(58) Field of Classification Search
CPC ..... H04W 48/12; H04W 48/06; H04W 76/18; H04W 36/30; H04W 48/02; H04W 4/00;
(Continued)

(56) References Cited

U.S. PATENT DOCUMENTS

| | | | |
|---|---|---|---|
| 6,741,757 B1* | 5/2004 | Torr ................... | G06K 9/00154 382/285 |
| 2009/0270104 A1* | 10/2009 | Du ....................... | H04W 48/02 455/436 |

(Continued)

FOREIGN PATENT DOCUMENTS

WO    2017043903    3/2017

OTHER PUBLICATIONS

PCT International Application No. PCT/KR2018/003173, International Search Report dated Jun. 11, 2018, 4 pages.
(Continued)

*Primary Examiner* — Joseph Arevalo
(74) *Attorney, Agent, or Firm* — Lee Hong Degerman Kang Waimey

(57) ABSTRACT

Provided are a method by which a terminal performs an access barring check in a wireless communication system and a device for supporting the same. The method may include: a step for entering an RRC_INACTIVE state; a step for performing the access barring check on a cell; a step for checking that access to the cell is prevented as many times as the maximum number of access attempts; and a step for transitioning from the RRC_INACTIVE state to an RRC_IDLE state.

13 Claims, 13 Drawing Sheets

(58) Field of Classification Search
CPC ... H04W 72/042; H04W 8/183; H04W 40/04; H04W 76/10; H04W 24/08; H04W 36/0061; H04W 48/16; H04W 48/20; H04W 4/70; H04W 4/90; H04W 52/0209; H04W 52/0212; H04W 74/0833; H04W 74/0875; H04W 76/15; H04W 76/19; H04W 76/20; H04W 84/042; H04W 88/06; H04W 88/08
USPC ...... 455/435.1, 434, 437, 445, 422.1, 404.1, 455/517, 410, 130, 423
See application file for complete search history.

(56) References Cited

U.S. PATENT DOCUMENTS

| | | | |
|---|---|---|---|
| 2010/0214410 A1* | 8/2010 | McClure | G08B 13/1961 348/143 |
| 2011/0199905 A1* | 8/2011 | Pinheiro | H04W 28/0215 370/235 |
| 2011/0279650 A1* | 11/2011 | Liao | G06T 7/41 348/46 |
| 2012/0113905 A1* | 5/2012 | Anderson | H04W 76/38 370/329 |
| 2012/0127934 A1* | 5/2012 | Anderson | H04W 72/0406 370/329 |
| 2013/0016841 A1* | 1/2013 | Fong | H04W 12/0013 380/287 |
| 2013/0122906 A1* | 5/2013 | Klatt | H04W 72/042 455/435.1 |
| 2013/0155235 A1* | 6/2013 | Clough | G06K 9/0063 348/144 |
| 2014/0089243 A1* | 3/2014 | Oppenheimer | G06K 7/10009 706/46 |
| 2014/0313345 A1* | 10/2014 | Conard | G06K 9/00664 348/169 |
| 2015/0223442 A1* | 8/2015 | Yamauchi | A01M 1/10 43/121 |
| 2016/0132750 A1* | 5/2016 | Yang | G06F 16/56 382/197 |
| 2016/0309379 A1* | 10/2016 | Pelletier | H04W 76/27 |
| 2017/0070933 A1* | 3/2017 | Hagiwara | H04W 4/70 |
| 2018/0189642 A1* | 7/2018 | Boesch | G06F 9/44505 |
| 2018/0255484 A1* | 9/2018 | Wu | H04B 7/0697 |
| 2018/0270713 A1* | 9/2018 | Park | H04L 5/0053 |
| 2018/0270792 A1* | 9/2018 | Park | H04W 76/28 |
| 2018/0270894 A1* | 9/2018 | Park | H04W 36/0055 |
| 2018/0270895 A1* | 9/2018 | Park | H04W 76/38 |
| 2018/0279376 A1* | 9/2018 | Dinan | H04W 74/0833 |
| 2019/0025854 A1* | 1/2019 | Rohani | G05D 1/0276 |
| 2019/0191483 A1* | 6/2019 | Ryoo | H04W 52/0229 |
| 2020/0196379 A1* | 6/2020 | Park | H04W 8/18 |

OTHER PUBLICATIONS

LG Electronics, "Access category based access barring mechanism", 3GPP TSG RAN WG2 Meeting #97bis, R2-1703338, Apr. 2017, 5 pages.
Qualcomm, "Unified Access Barring for NR", 3GPP TSG RAN WG2 Meeting #97, R2-1701787, Feb. 2017, 4 pages.
Samsung, "Barring mechanism for NR", 3GPP TSG RAN WG2 Meeting #95bis, R2-166359, Oct. 2016, 5 pages.
Qualcomm, "Correction to access barring checking for network sharing case", 3GPP TSG RAN WG2 Meeting #95, R2-164676, Aug. 2016, 5 pages.

* cited by examiner

METHOD AND DEVICE FOR PERFORMING ACCESS BARRING CHECK

CROSS-REFERENCE TO RELATED APPLICATIONS

This application is the National Stage filing under 35 U.S.C. 371 of International Application No. PCT/KR2018/003173, filed on Mar. 19, 2018, which claims the benefit of U.S. Provisional Application No. 62/486,943, filed on Apr. 18, 2017, the contents of which are all hereby incorporated by reference herein in their entirety.

BACKGROUND

Field of the Disclosure

The present disclosure relates to a wireless communication system, and more particularly, to a method of performing access barring check by a terminal, and an apparatus supporting the method.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

SUMMARY OF THE DISCLOSURE

Meanwhile, a terminal in an RRC_INACTIVE state may need to transition to an RRC_CONNECTED state or an RRC_ACTIVE state to transmit data or signaling. In this case, a unified access control mechanism may be applied to all RRC states including the RRC_INACTIVE state. Accordingly, for example, due to a network overload or congestion, the terminal in the RRC_INACTIVE state may be barred from accessing to a cell.

If the access to the cell is barred, a signaling overhead may be caused when the terminal directly transitions to the RRC_IDLE state. Alternatively, if the access to the cell is barred, it may also be of no benefit for the terminal to remain in the RRC_INACTIVE state in order to continuously attempt the access to the cell. Accordingly, there may be a need to propose a method of performing access barring check by a terminal, and an apparatus supporting the method.

In an embodiment, there is provided a method of performing access barring check by a terminal in a wireless communication system. The method may include: entering an RRC_INACTIVE state; performing the access barring check on a cell; checking that an access to the cell is barred as many times as the maximum number of access attempts; and transitioning from the RRC_INACTIVE state to an RRC_IDLE state.

In another embodiment, there is provided a method of performing access barring check by a terminal in a wireless communication system. The method may include: entering an RRC_INACTIVE state; initiating an access timer; performing the access barring check on a cell; checking that an access to the cell is barred, until the access timer expires; and transitioning from the RRC_INACTIVE state to an RRC_IDLE state.

In another embodiment, there is provided a terminal for performing access barring check in a wireless communication system. The terminal may include: a memory; a transceiver, and a processor coupling the memory and the transceiver. The processor may be configured to: enter an RRC_INACTIVE state; perform the access barring check on a cell; check that an access to the cell is barred as many times as the maximum number of access attempts; and transition from the RRC_INACTIVE state to an RRC_IDLE state.

Unnecessary signaling can be prevented from occurring between a terminal and a base station.

DESCRIPTION OF EXEMPLARY EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present disclosure are not limited thereto.

Figure 1:
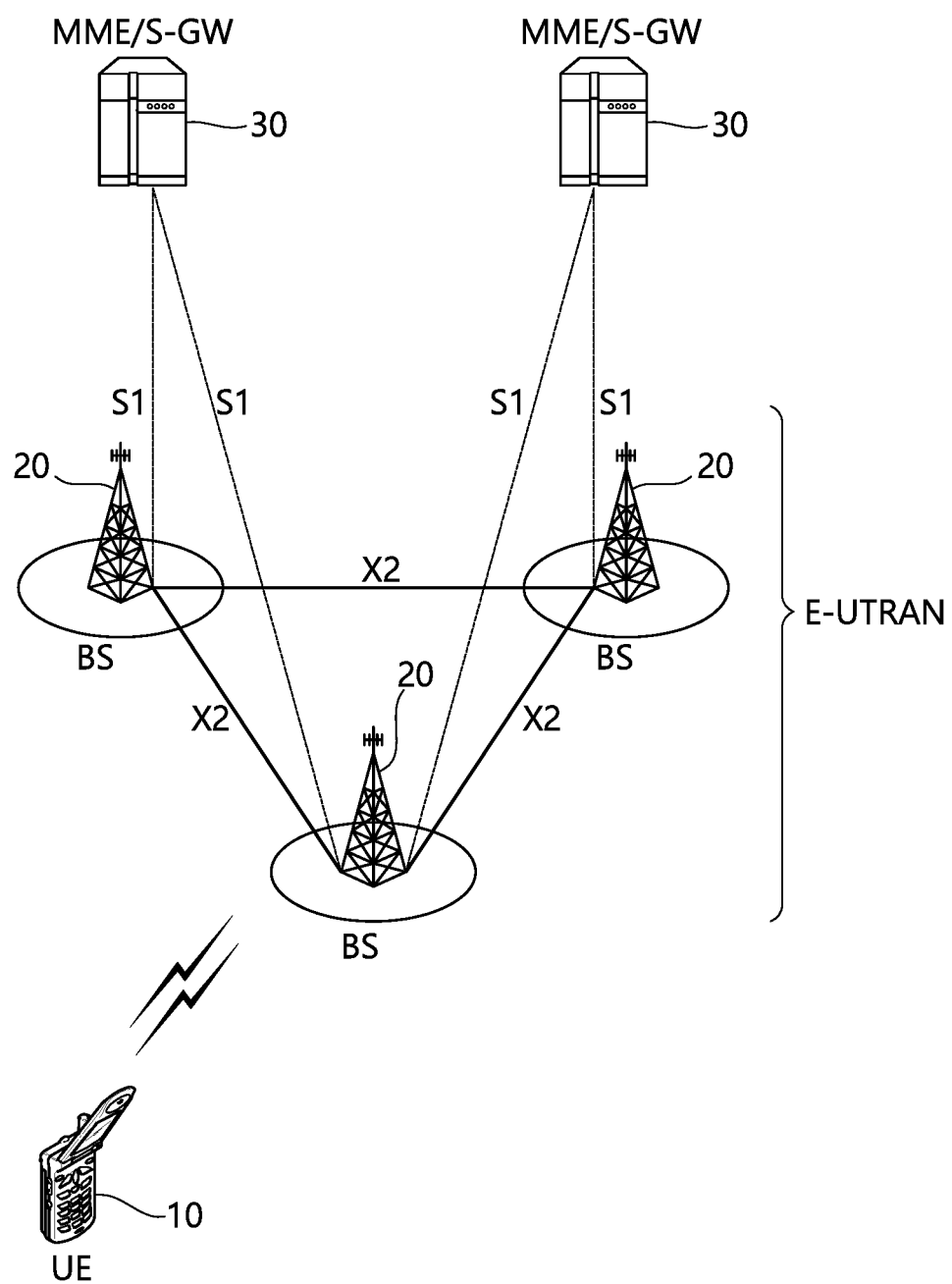
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE) (10), an evolved-UMTS terrestrial radio access network (E-UTRAN) and an evolved packet core (EPC). The UE (10) refers to a communication equipment carried by a user. The UE (10) may be fixed or mobile, and may be referred to as another terminology, such as a mobile station (MS), a user terminal (UT), a subscriber station (SS), a wireless device, etc.

The E-UTRAN includes one or more evolved node-B (eNB) (20), and a plurality of UEs may be located in one cell. The eNB (20) provides an end point of a control plane and a user plane to the UE (10). The eNB (20) is generally a fixed station that communicates with the UE (10) and may be referred to as another terminology, such as a base station (BS), a base transceiver system (BTS), an access point, etc. One eNB (20) may be deployed per cell. There are one or more cells within the coverage of the eNB (20). A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB (20) to the UE (10), and an uplink (UL) denotes communication from the UE (10) to the eNB (20). In the DL, a transmitter may be a part of the eNB (20), and a receiver may be a part of the UE (10). In the UL, the transmitter may be a part of the UE (10), and the receiver may be a part of the eNB (20).

The EPC includes a mobility management entity (MME) which is in charge of control plane functions, and a system architecture evolution (SAE) gateway (S-GW) which is in charge of user plane functions. The MME/S-GW (30) may be positioned at the end of the network and connected to an external network. The MME has UE access information or UE capability information, and such information may be primarily used in UE mobility management. The S-GW is a gateway of which an endpoint is an E-UTRAN. The MME/S-GW (30) provides an end point of a session and mobility management function for the UE (10). The EPC may further include a packet data network (PDN) gateway (PDN-GW). The PDN-GW is a gateway of which an endpoint is a PDN.

The MME provides various functions including non-access stratum (NAS) signaling to eNBs (20), NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW (30) will be referred to herein simply as a "gateway," but it is understood that this entity includes both the MME and S-GW.

Interfaces for transmitting user traffic or control traffic may be used. The UE (10) and the eNB (20) are connected by means of a Uu interface. The eNBs (20) are interconnected by means of an X2 interface. Neighbor eNBs may have a meshed network structure that has the X2 interface. The eNBs (20) are connected to the EPC by means of an S1 interface. The eNBs (20) are connected to the MME by means of an S1-MME interface, and are connected to the S-GW by means of S1-U interface. The S1 interface supports a many-to-many relation between the eNB (20) and the MME/S-GW.

The eNB (20) may perform functions of selection for gateway (30), routing toward the gateway (30) during a radio resource control (RRC) activation, scheduling and transmitting of paging messages, scheduling and transmitting of broadcast channel (BCH) information, dynamic allocation of resources to the UEs (10) in both UL and DL, configuration and provisioning of eNB measurements, radio bearer control, radio admission control (RAC), and connection mobility control in LTE_ACTIVE state. In the EPC, and as noted above, gateway (30) may perform functions of paging origination, LTE_IDLE state management, ciphering of the user plane, SAE bearer control, and ciphering and integrity protection of NAS signaling.

Figure 2:
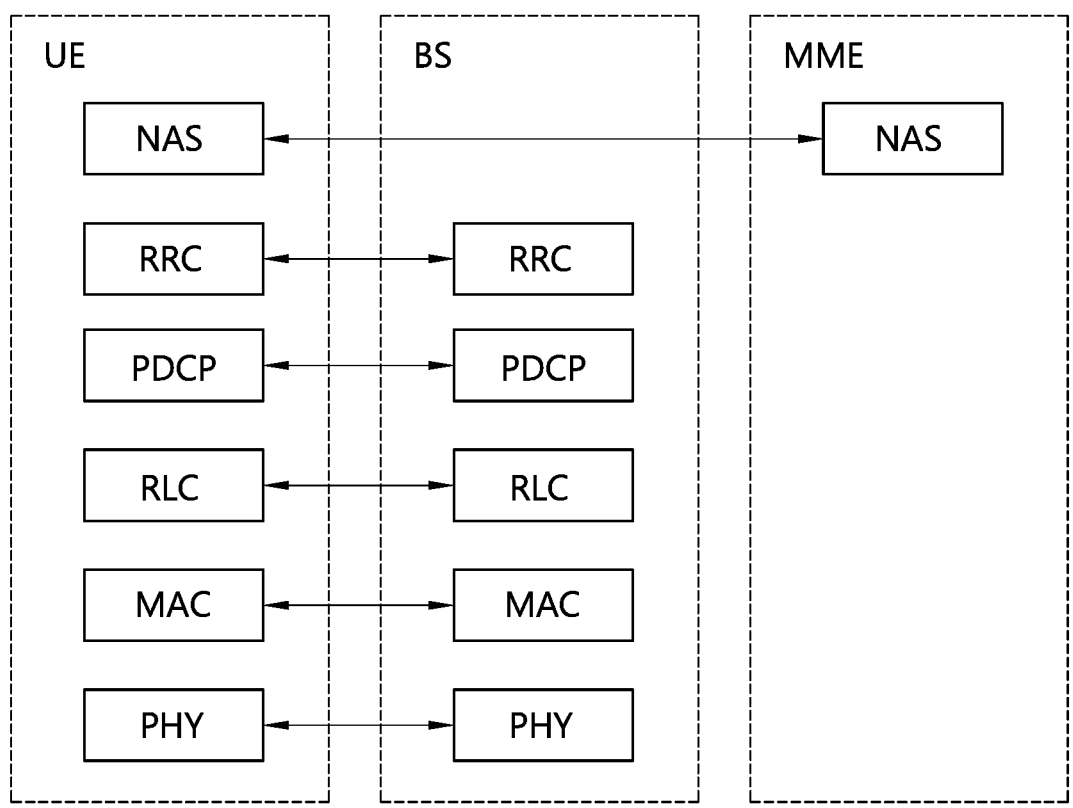
FIG. 2 shows a control plane of a radio interface protocol of an LTE system.
Figure 3:
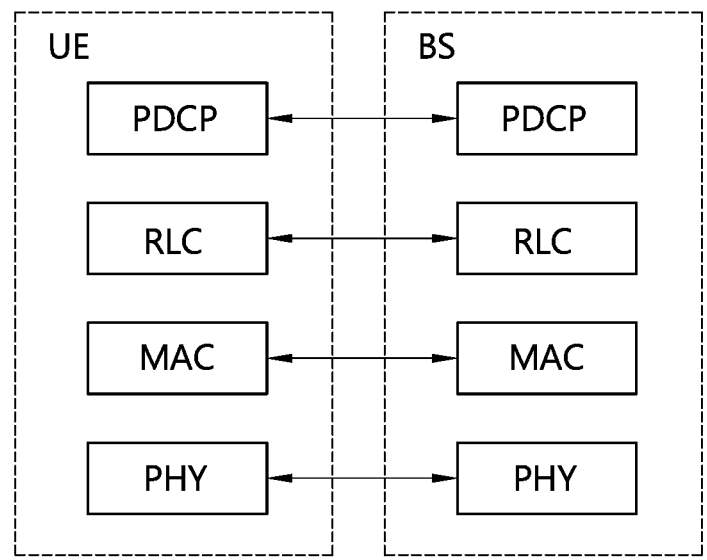
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC state of a UE and an RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE needs to transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a 5G network structure is described.

Figure 4:
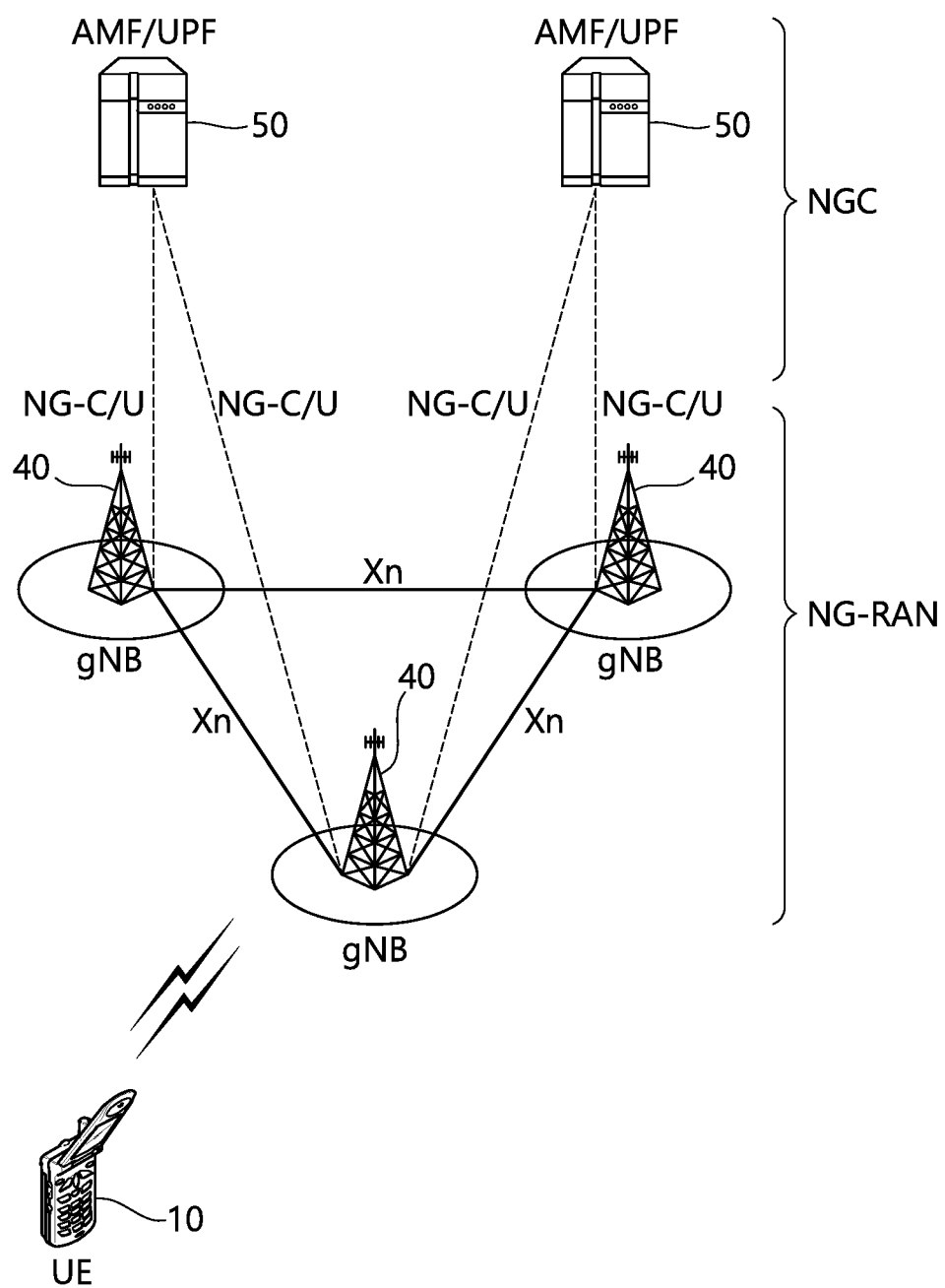
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE (10), a next generation-radio access network (NG-RAN), and a next generation core (NGC).

The NG-RAN may include at least one gNB (40), and a plurality of UEs may be present in one cell. The gNB (40) provides the UE with end points of the control plane and the user plane. The gNB (40) is generally a fixed station that communicates with the UE (10) and may be referred to as another terminology, such as a base station (BS), a base transceiver system (BTS), an access point, or the like. One gNB (40) may be arranged in every cell. At least one cell may be present in a coverage of the gNB (40).

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE (10) and the gNB (40) may be connected by means of a Uu interface. The gNBs (40) may be interconnected by means of an X2 interface. Neighboring gNBs (40) may have a meshed network structure based on an Xn interface. The gNBs (40) may be connected to an NGC by means of an NG interface. The gNBs (40) may be connected to an AMF by means of an NGC interface, and may be connected to a UPF by means of an NG-U interface. The NG interface supports a many-to-many-relation between the gNB (40) and the AMF/UPF (50).

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signaling termination, NAS signaling security, AS security control, inter CN node signaling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on NR standardization, an RRC_INACTIVE state has been newly introduced in addition to the existing RRC_CONNECTED state and RRC_IDLE state. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG interface between a gNB and an NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

For a UE in a lightly connected mode, an MME may maintain the S1 connection of the activated UE in order to hide a state transition and mobility from a core network. That is, for a UE in the RRC_INACTIVE state, an AMF may maintain the NG connection of the activated UE in order to hide a state transition and mobility from a next-generation core (NGC). In this specification, an RRC_INACTIVE state may be similar in concept to a lightly connected mode, a lightweight connected mode, or a semi-connected mode.

Hereinafter, access class barring (ACB) will be described.

Figure 5:
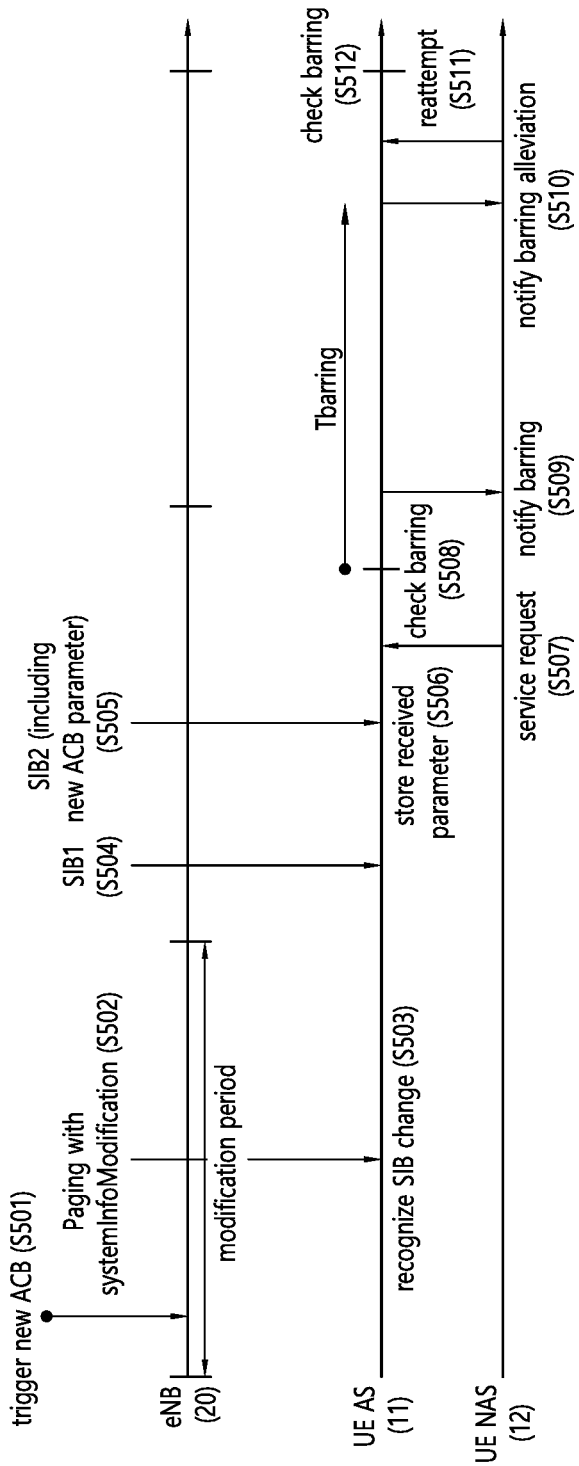
FIG. 5 shows an access class barring (ACB) operation.

FIG. 5 shows an ACB operation.

Referring to FIG. 5, ACB is a technique for controlling access of a UE to control system load, which includes a stage in which an eNB broadcasts barring information to UEs in advance and a stage in which UEs attempt to perform access based on a class that the UEs have and the barring information broadcast by the eNB. When new ACB information is triggered (S501), the eNB may notify an UE AS that SIB (SystemInformationBlock) information is to be changed soon due to the new ACB information, using a systemInfoModification IE of a paging (S502). The UE receiving the paging may recognize that the SIB information to be changed soon (S503). The systemInfoModication IE included in the paging is an indicator indicating that the SIB information is changed, and the indicator may have different forms according to embodiments.

The eNB may notify the UE that the SIB information is to be changed soon through a paging in a modification period before broadcasting changed SIB information. Thereafter, the changed SIB information is broadcast in a next modification period.

After completing the modification period in which the paging is received, the UE receives SIB1 information to receive new SIB information (S504). There are several types of SIBs depending on purposes. SIB1 to SIB14 exist in Rel-11 LTE technology, and SIBs are continuously developed to support new functions of standard technologies. Among different SIBs, SIB1 may include scheduling information on other SIBs. Therefore, SIB1 needs to be received first in order to receive other SIB information.

Subsequently, the UE may receive SIB2 information including ACB information (S505). The UE AS may store the ACB information (S506). A UE NAS may send a service request to the UE AS when a service, that is, communication, is needed (S507). Then, the UE AS may determine whether to allow access based on the stored ACB information (S508). A UE is necessarily assigned a class with a value between 0 and 9. Further, the UE may further be assigned a class having a value of 11 to 15 for a special purpose. In addition, there is class 10 associated with an emergency call. The eNB may restrict access to a particular class. In LTE technology, access to any designated one of classes 0 to 9 may not be restricted, and access to one or more designated classes among classes 11 to 15 for special purposes may be restricted.

Instead, the eNB may provide a barring factor and barring time information with respect to classes 0 to 9. The barring factor may be a value ranging from 0 to 1. The UE selects one random value between 0 and 1 and compares the value with the barring factor. When the value selected by the UE is lower than the barring factor, it may be determined that access is allowed. When the value selected by the UE is higher than the barring factor, access is not allowed and the UE may notify the UE NAS that access is not allowed (S509). When access is not allowed, the UE AS may calculate a Tbarring value using the barring time information and the following equation. The following Equation 1 shows a method of calculating the Tbarring value according to the embodiment. A different Tbarring value may be calculated depending on an embodiment.

$$Tbarring=(0.7+0.6\times rand)\times ac\text{-BarringTime} \quad \text{[Equation 1]}$$

After Tbarring time, the UE AS may notify the UE NAS that it is possible to reattempt access (S510). Here, the UE NAS reattempts to access the UE AS (S511), and the UE AS may perform a barring check again (S512). The process described in FIG. 5 may correspond to a general mobile originating (MO) call or signaling, that is, a service request triggered by a UE.

An emergency call triggered by a UE is slightly different from the above process. ACB information for an emergency call differs from an MO call or signaling. That is, ac-barringForEmergency information is provided instead of a barring factor or barring time information. The IE may indicate only whether an emergency call is allowed in a Boolean type. When the IE is set to true, the IE indicates that no emergency call is allowed, and access may finally be denied after checking a predetermined additional condition.

Also, since no barring time information is provided, there is no stage in which the UE AS notifies the UE NAS whether access is possible after Tbarring.

Meanwhile, a UE in an RRC_INACTIVE state may need to transition to an RRC_CONNECTED state or an RRC_ACTIVE state to transmit data or signaling. In this case, a unified access control mechanism may be applied to all RRC states including the RRC_INACTIVE state. Accordingly, for example, due to a network overload or congestion, the UE in the RRC_INACTIVE state may be barred from accessing to a cell.

If the access to the cell is barred, a signaling overhead may be caused when the UE directly transitions to the RRC_IDLE state. That is, when the access to the cell is barred after the UE performs the access barring check only one time, transitioning to the RRC_IDLE state may cause the signaling overhead. Specifically, upon checking that the access to the cell is barred, if an UE in an RRC_INACTIVE state transitions to directly to the RRC_IDLE state without having to perform the access barring check again, a network which still has data to be transmitted may attempt to allow the UE to transition back to the RRC_CONNECTED state, which may lead to the signaling overhead. This is because, if all UEs, of which access is barred while in the RRC_INACTIVE state, transition to the RRC_IDLE state, after a network congestion or overload is mitigated, a great amount of signaling may be required in order for the UE, which has transitioned to the RRC_IDLE state, to transition to the RRC_CONNECTED state.

Alternatively, if the access to the cell is barred, it may also be of no benefit for the UE to remain in the RRC_INACTIVE state in order to continuously attempt the access to the cell. Specifically, the UE in the RRC_INACTIVE state has to perform a periodic update, and a BS expects the UE to perform the periodic update. However, if the UE does not receive any response from the BS, the BS will treat the UE as if it is in the RRC_IDLE state, and in such a situation, there will be no benefit for the terminal to continuously remain in the RRC_INACTIVE state. Therefore, it may be desirable for the UE to transition to the RRC_IDLE state rather than to remain in the RRC_INACTIVE state to continuously attempt the access to the cell.

Hereinafter, a method of performing access barring check by a UE, and an apparatus supporting the method will be described according to an embodiment of the present disclosure.

According to an embodiment of the present disclosure, the UE may retry an access to a network as many times as the specific number of times. The UE may be in an RRC_INACTIVE state. Alternatively, the UE may be in an RRC_CONNECTED state. In the present specification, the specific number of times, the maximum number of access attempts, the number of access retries, and the number of access attempts may be used in the same concept. The specific number of times may be configured by the network when necessary. Alternatively, the specific number of times may be pre-configured by the UE. For example, if the UE receives an access barring configuration together with the specific number of times, the UE may retry the access by the pre-configured specific number of times. In addition, after the UE attempts the access to the cell as many times as the specific number of times, the UE may transition to an RRC_IDLE state upon checking that the access to the cell is still barred.

According to an embodiment of the present disclosure, the UE may retry an access to a network for a specific time. For example, the specific time may be a period in which an access timer runs. The UE may be in an RRC_INACTIVE state. Alternatively, the UE may be in an RRC_CONNECTED state. The specific time may be configured by the network when necessary. Alternatively, the specific time may be pre-configured by the UE. For example, if the UE receives an access barring configuration together with the specific time, the UE may retry the access for the specific time. In addition, if the UE checks that the access to the cell is still barred even after the specific time, the UE may transition to the RRC_IDLE state.

According to an embodiment of the present disclosure, the UE may retry the access to the network as many times as the specific number of times or may retry it for a specific time. For example, if the UE fails in the access to the cell as many times as the specific number of times, even if the access timer is running, the UE may transition to the RRC_IDLE state. For example, if the access timer expires while the UE attempts the access to the cell, even if the UE does not attempt the access to the cell as many times as the specific number of times, the UE may transition to the RRC_IDLE state.

According to an embodiment of the present disclosure, the specific number of times or the specific time may be received through broadcast signaling or dedicated signaling. The specific number of times or the specific time may be received through system information. The specific number of times or the specific time may be included in AC-BarringConfig of SIB2. The specific number of times or the specific time may be configured through the dedicated signaling when the UE enters the RRC_INACTIVE state. For example, when the UE enters the RRC_INACTIVE state, the network may configure the specific number of times or specific time used in the RRC_INACTIVE state.

The specific number of times may be designated according to the RRC state. For example, the specific number of times may be the number of access retries used by the UE in all RRC states. For example, the specific number of times may be the number of access retries used by the UE in the RRC_CONNECTED state. For example, the specific number of times may be the number of access retries used by the UE in the RRC_IDLE state. For example, the specific number of times may be the number of access retries used by the UE in the RRC_INACTIVE state. The specific time may be designated according to the RRC state. For example, the specific time may be an access timer used by the UE in all RRC states. For example, the specific time may be an access timer used by the UE in the RRC_CONNECTED state. For example, the specific time may be an access timer used by the UE in the RRC_IDLE state. For example, the specific time may be an access timer used by the UE in the RRC_INACTIVE state. The specific number of times or the specific time may be distinct according to a service. Alternatively, the specific number of times or the specific time may be distinct according to an establishment cause.

According to an embodiment of the present disclosure, the UE may retry the access to the cell for the specific time or as many times as the specific number of times. In general, since a network overload or congestion may be mitigated after a short time, the UE may successfully transmit data or signaling to the network without having to unnecessarily transition to the RRC_IDLE state. Further, if the access to the cell fails for the specific time or as many times as the specific number of times, the UE may transition to the RRC_IDLE state without having to persistently attempt the access to the cell unnecessarily. Therefore, according to an embodiment of the present disclosure, unnecessary signaling can be prevented from occurring.

Figure 6:
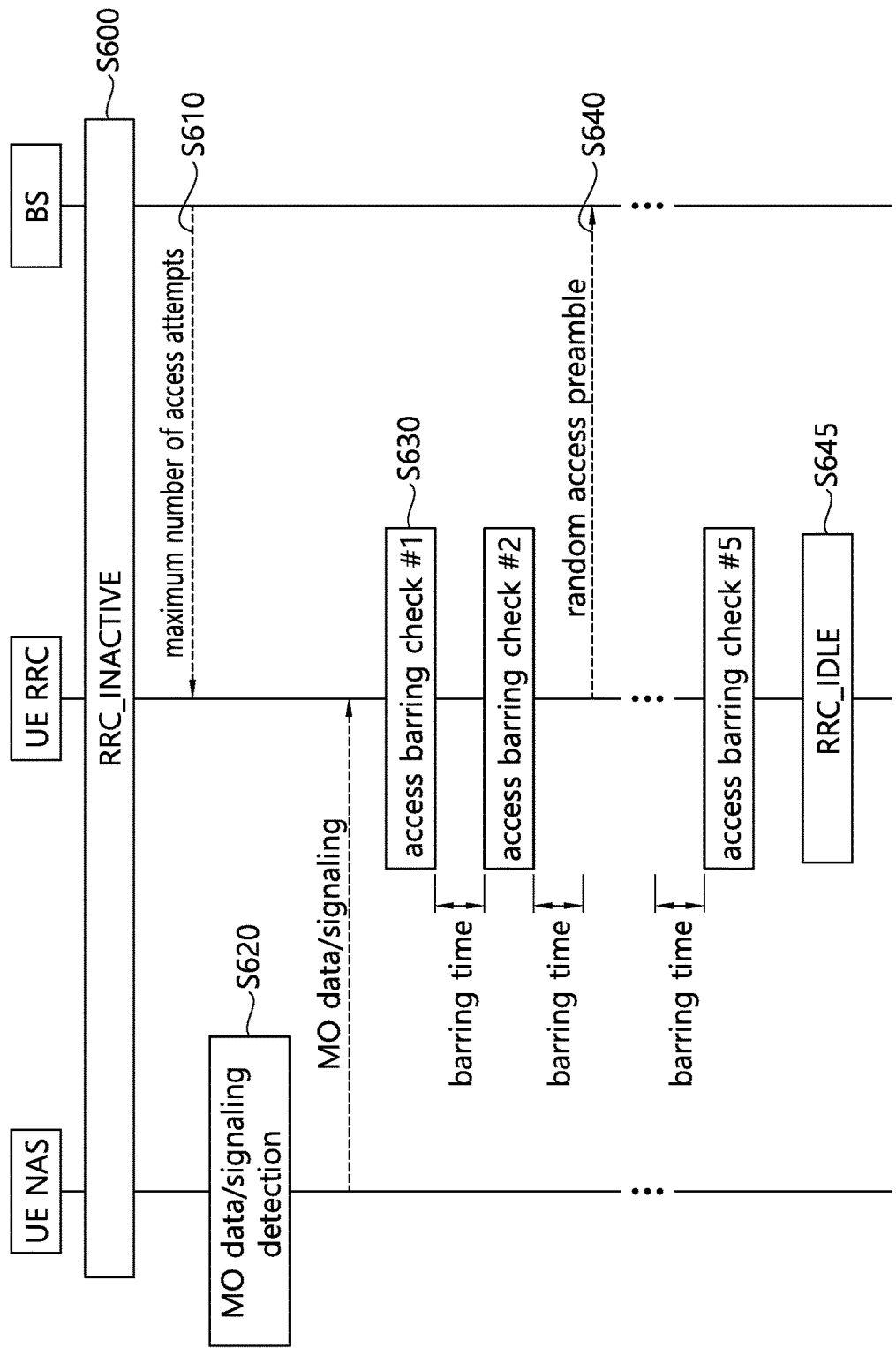
FIG. 6 shows a procedure of performing access barring check on the basis of the maximum number of access attempts according to an embodiment of the present disclosure.

FIG. 6 shows a procedure of performing access barring check on the basis of the maximum number of access attempts according to an embodiment of the present disclosure.

Referring to FIG. 6, in step S600, a UE may enter an RRC_INACTIVE state.

In step S610, the UE may receive the maximum number of access attempts from a BS. The maximum number of access attempts may be received through a system information block (e.g., SIB2). Alternatively, the maximum number of access attempts may be received through dedicated signaling. The maximum number of access attempts may be for a specific access (e.g., MO data/signaling).

Alternatively, the UE may pre-configure the maximum number of access attempts. In this case, step S610 may be omitted.

In the embodiment of FIG. 6, it is assumed that the maximum number of access attempts used by the UE in the RRC_INACTIVE state is 5, and the maximum number of access attempts used by the UE in an RRC_IDLE state is 3.

In step S620, the UE may detect any MO data/signaling. In addition, the UE in the RRC_INACTIVE state may initiate a procedure of transitioning to an RRC_CONNECTED state to transmit data/signaling. Specifically, upon detecting any MO data/signaling of an NAS layer of the UE, an NAS layer of the UE may transfer the MO data/signaling to an RRC layer of the UE.

In step S630, the UE may perform access barring check. If an access to a cell is barred, the UE may retry an access to a network as many times as the maximum number of access attempts. If the access to the cell is barred, the UE may retry the access to the cell after waiting for a predetermined barring time.

In step S640, if the access to the cell is not barred, the UE may initiate a random access procedure, and may transition to the RRC_CONNECTED state.

Alternatively, if the UE retries the access to the network as many times as the maximum number of access attempts but the access to the cell is still barred, in step S645, the UE may transition to the RRC_IDLE state. In this case, the RRC layer of the UE may notify the NAS layer of the UE of a failure.

Figure 7:
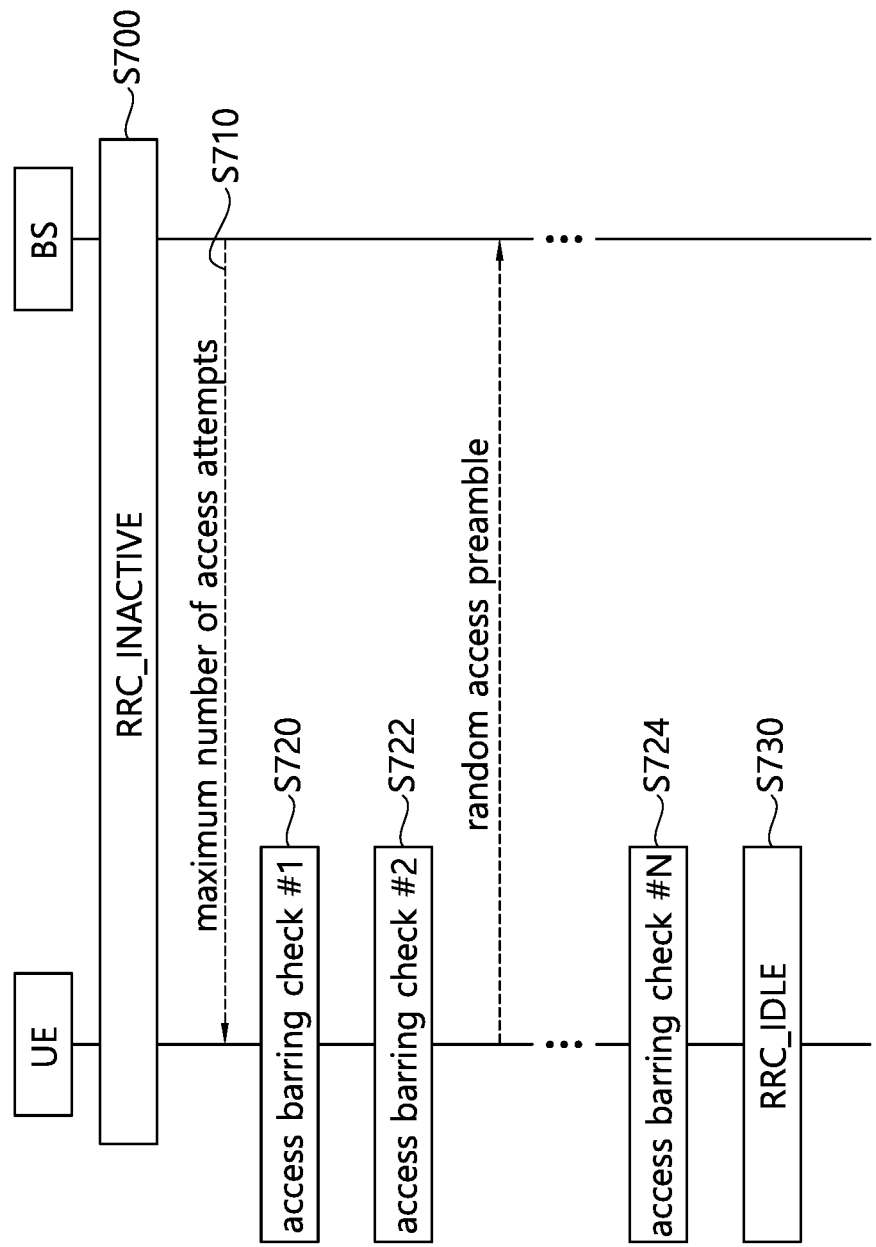
FIG. 7 shows a procedure of performing access barring check on the basis of the maximum number of access attempts according to an embodiment of the present disclosure.

FIG. 7 shows a procedure of performing access barring check on the basis of the maximum number of access attempts according to an embodiment of the present disclosure.

Referring to FIG. 7, in step S700, a UE may enter an RRC_INACTIVE state.

In step S710, the UE may receive the maximum number of access attempts from a BS. The maximum number of access attempts may be configured as a different value according to an RRC state. For example, the maximum number of access attempts may include at least any one of the maximum number of access attempts for a UE in an RRC_IDLE state, the maximum number of access attempts for a UE in an RRC_CONNECTED state, and the maximum number of access attempts for a UE in an RRC_INACTIVE state. The maximum number of access attempts may be configured as a different value according to a service. The maximum number of access attempts may be configured as a different value according to an establishment cause. In the embodiment of FIG. 7, it is assumed that the maximum number of access attempts for the UE in the RRC_INACTIVE state is N. Alternatively, if the UE pre-configures the maximum number of access attempts, step S710 may be omitted.

In step S720, the UE may perform first access barring check. For example, the access barring check may be performed by an RRC layer of the UE since an NAS layer of the UE detects MO data/signaling.

Upon determining that an access to a cell is barred according to the first access barring check, in step S722, the UE may perform second access barring check. The second access barring check may be performed after a predetermined barring time elapses.

Upon determining that the access to the cell is not barred according to the second access barring check, the UE may initiate a random access procedure, and may enter an RRC_CONNECTED state.

Upon determining that the access to the cell is barred according to the second access barring check, the UE may perform next access barring check. In step S724, the UE may perform N-th access barring check. In addition, it may be determined that the access to the cell is barred according to the N-th access barring check.

Although the UE performs the access barring check as many times as the maximum number of access attempts, the access to the cell may be still barred. Therefore, in step S730, the UE may transition to the RRC_IDLE state. In this case, the RRC layer of the UE may notify the NAS layer of the UE of a failure.

Figure 8:
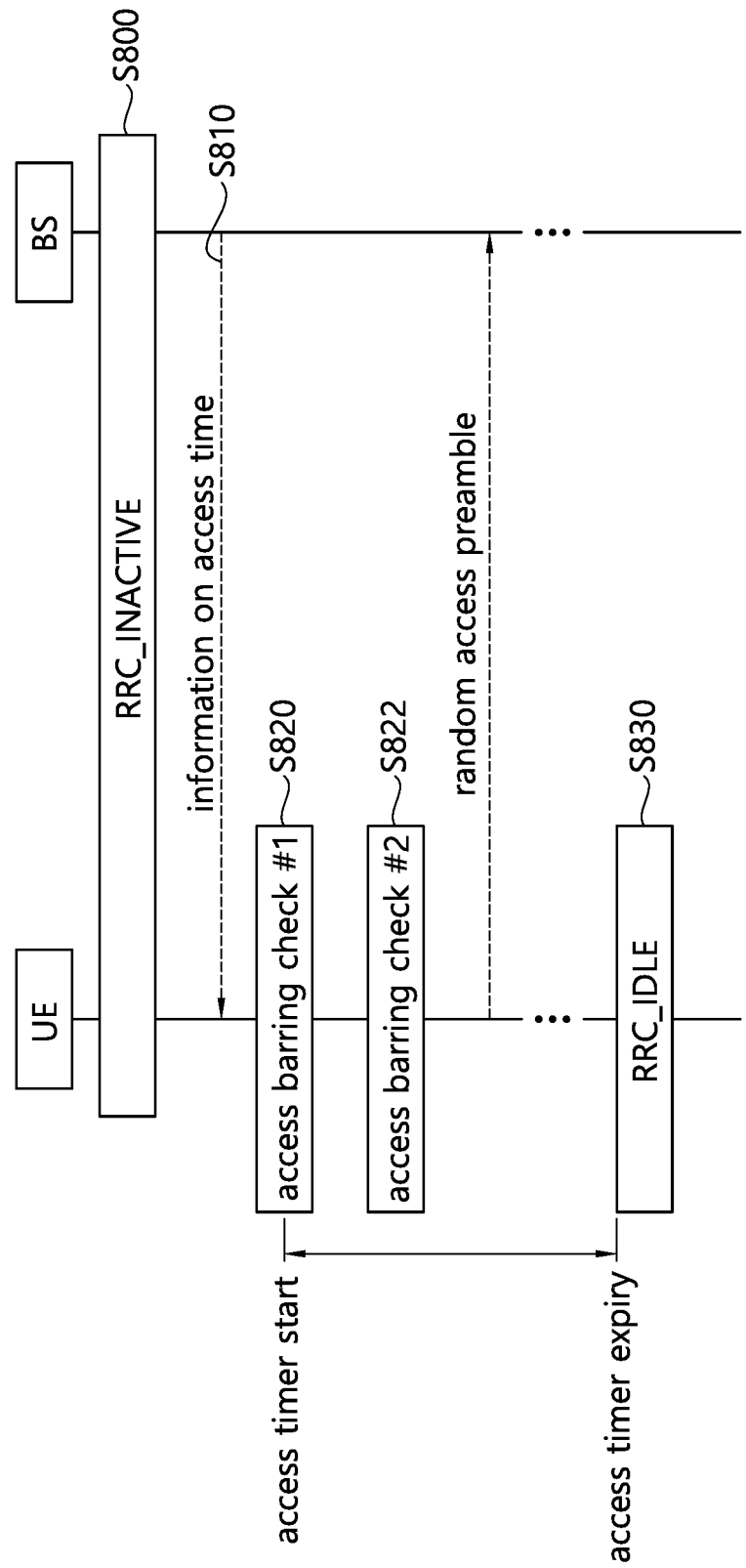
FIG. 8 shows a procedure of performing access barring check on the basis of an access time according to an embodiment of the present disclosure.

FIG. 8 shows a procedure of performing access barring check on the basis of an access time according to an embodiment of the present disclosure.

Referring to FIG. 8, in step S800, a UE may enter an RRC_INACTIVE state.

In step S810, the UE may receive information on an access time from a BS. The information on the access time may be information on a duration in which the UE is allowed to perform the access barring check. For example, the information on the access time may include an access timer. The UE may perform the access barring check only while the access timer runs. The access timer may be configured as a different value according to the RRC state. For example, the access timer may include at least any one of an access timer for a UE in the RRC_IDLE state, an access timer for a UE in the RRC_CONNECTED state, and an access timer for a UE in the RRC_INACTIVE state. The access timer may be configured as a different value according to a service. The access timer may be configured as a different value according to an establishment cause. Alternatively, if the UE pre-configures the access timer, step S810 may be omitted.

In step S820, the UE may perform first access barring check. For example, the access barring check may be performed by an RRC layer of the UE since an NAS layer of the UE detects MO data/signaling. Before the first access barring check is performed, the UE may initiate the access timer. Alternatively, after the first access barring check is performed, the UE may initiate the access timer. That is, upon checking that the access to the cell is barred according to the first access barring check, the UE may initiate the access timer.

Upon determining that the access to the cell is barred according to the first access barring check, in step S822, the UE may perform second access barring check. The second access barring check may be performed after a predetermined barring time elapses. The second access barring check may be performed while the access timer runs.

Upon determining that the access to the cell is not barred according to the second access barring check, the UE may initiate the random access procedure, and may enter the RRC_CONNECTED state.

Upon determining that the access to the cell is barred according to the second access barring check, the UE may perform next access barring check. The next access barring check may be performed while the access timer runs. At the expiry of the access timer, the UE may no longer perform the access barring check. The UE may interrupt the access barring check. Accordingly, in step S830, the UE may transition to the RRC_IDLE state. In this case, the RRC layer of the UE may notify the NAS layer of the UE of a failure.

Figure 9:
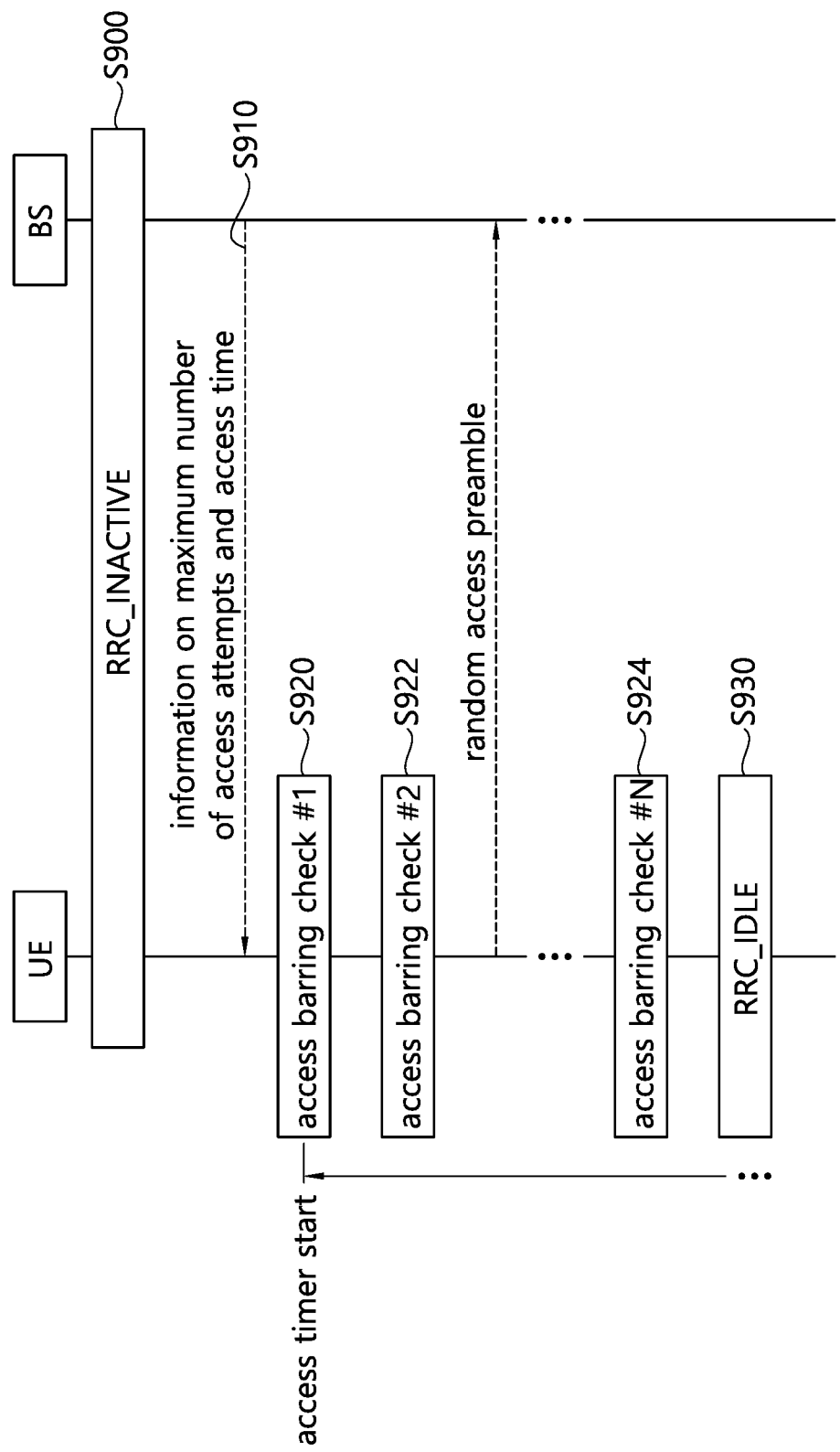
FIG. 9 shows a procedure of performing access barring check on the basis of the maximum number of access attempts and an access time according to an embodiment of the present disclosure.

FIG. 9 shows a procedure of performing access barring check on the basis of the maximum number of access attempts and an access time according to an embodiment of the present disclosure.

Referring to FIG. 9, in step S900, a UE may enter an RRC_INACTIVE state.

In step S910, the UE may receive the maximum number of access attempts from a BS. The maximum number of access attempts may be configured as a different value according to an RRC state. For example, the maximum number of access attempts may include at least any one of the maximum number of access attempts for a UE in an RRC_IDLE state, the maximum number of access attempts for a UE in an RRC_CONNECTED state, and the maximum number of access attempts for a UE in an RRC_INACTIVE state. The maximum number of access attempts may be configured as a different value according to a service. The maximum number of access attempts may be configured as a different value according to an establishment cause. In the embodiment of FIG. 9, it is assumed that the maximum number of access attempts for the UE in the RRC_INACTIVE state is N.

In addition, in step S910, the UE may receive information on an access time from the BS. The information on the access time may be information on a duration in which the UE is allowed to perform the access barring check. For example, the information on the access time may include an access timer. The UE may perform the access barring check only while the access timer runs. The access timer may be configured as a different value according to the RRC state. For example, the access timer may include at least any one of an access timer for a UE in the RRC_IDLE state, an access timer for a UE in the RRC_CONNECTED state, and an access timer for a UE in the RRC_INACTIVE state. The access timer may be configured as a different value according to a service. The access timer may be configured as a different value according to an establishment cause.

Alternatively, if the UE pre-configures the maximum number of access attempts and an access timer, step S910 may be omitted.

In step S920, the UE may perform first access barring check. For example, the access barring check may be performed by an RRC layer of the UE since an NAS layer of the UE detects MO data/signaling. Before the first access barring check is performed, the UE may initiate the access timer. Alternatively, after the first access barring check is performed, the UE may initiate the access timer. That is, upon checking that the access to the cell is barred according to the first access barring check, the UE may initiate the access timer.

Upon determining that the access to the cell is barred according to the first access barring check, in step S922, the UE may perform second access barring check. The second access barring check may be performed after a predetermined barring time elapses. The second access barring check may be performed while the access timer runs.

Upon determining that the access to the cell is not barred according to the second access barring check, the UE may initiate the random access procedure, and may enter the RRC_CONNECTED state.

Upon determining that the access to the cell is barred according to the second access barring check, the UE may perform next access barring check. The next access barring check may be performed while the access timer runs. In step S924, the UE may perform N-th access barring check. In addition, it may be determined that the access to the cell is barred according to the N-th access barring check.

Although the UE performs the access barring check as many times as the maximum number of access attempts, the access to the cell may still be barred. Therefore, in step S930, the UE may transition to the RRC_IDLE state even if the access timer is running. In this case, the RRC layer of the UE may notify the NAS layer of the UE of a failure.

Figure 10:
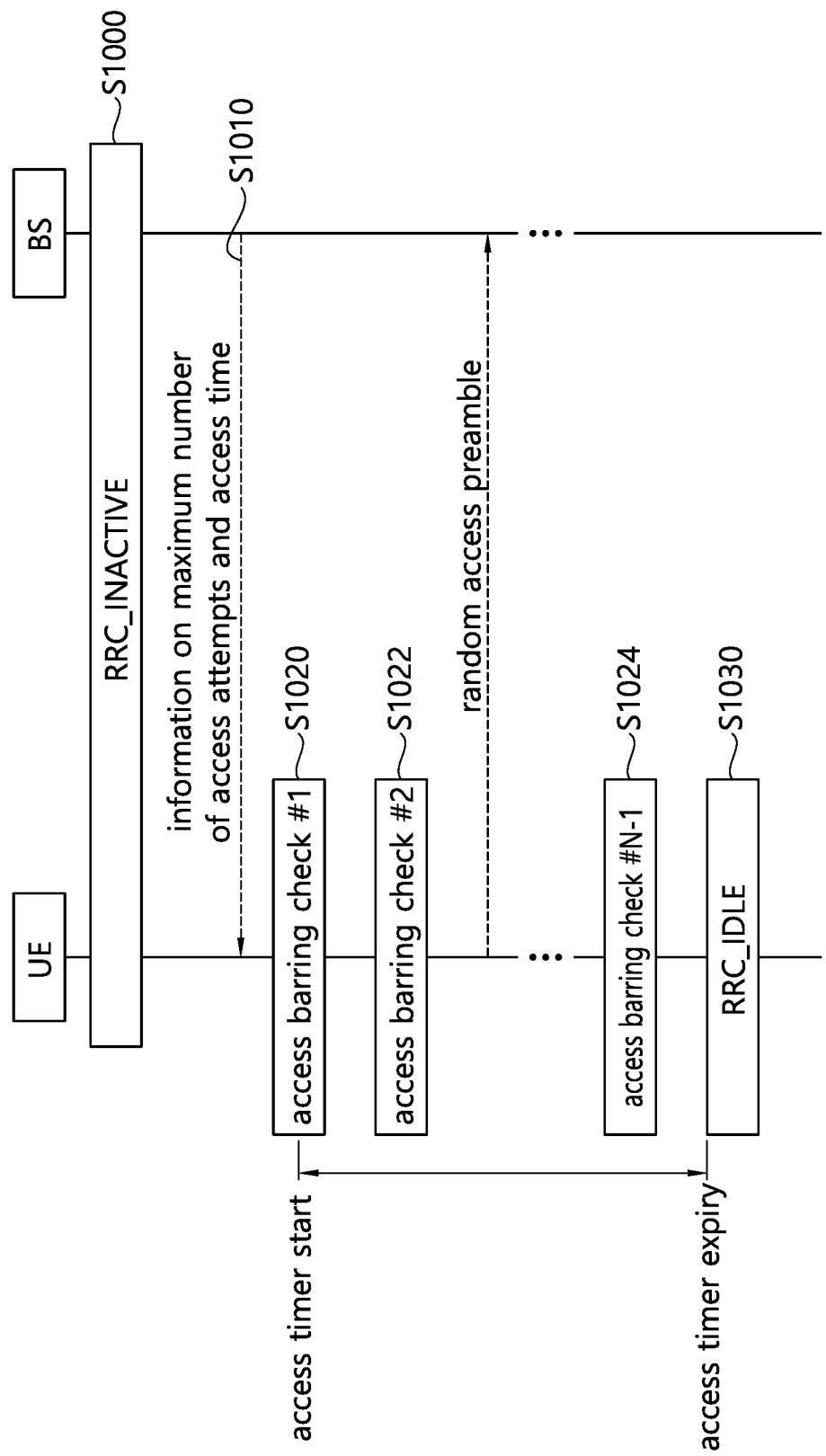
FIG. 10 shows a procedure of performing access barring check on the basis of the maximum number of access attempts and an access time according to an embodiment of the present disclosure.

FIG. 10 shows a procedure of performing access barring check on the basis of the maximum number of access attempts and an access time according to an embodiment of the present disclosure.

Referring to FIG. 10, in step S1000, a UE may enter an RRC_INACTIVE state.

In step S1010, the UE may receive the maximum number of access attempts from a BS. The maximum number of access attempts may be configured as a different value according to an RRC state. For example, the maximum number of access attempts may include at least any one of the maximum number of access attempts for a UE in an RRC_IDLE state, the maximum number of access attempts for a UE in an RRC_CONNECTED state, and the maximum number of access attempts for a UE in an RRC_INACTIVE state. The maximum number of access attempts may be configured as a different value according to a service. The maximum number of access attempts may be configured as a different value according to an establishment cause. In the embodiment of FIG. 10, it is assumed that the maximum number of access attempts for the UE in the RRC_INACTIVE state is N.

In addition, in step S1010, the UE may receive information on an access time from the BS. The information on the access time may be information on a duration in which the UE is allowed to perform the access barring check. For example, the information on the access time may include an access timer. The UE may perform the access barring check only while the access timer runs. The access timer may be configured as a different value according to the RRC state. For example, the access timer may include at least any one of an access timer for a UE in the RRC_IDLE state, an access timer for a UE in the RRC_CONNECTED state, and an access timer for a UE in the RRC_INACTIVE state. The access timer may be configured as a different value according to a service. The access timer may be configured as a different value according to an establishment cause.

Alternatively, if the UE pre-configures the maximum number of access attempts and an access timer, step S1010 may be omitted.

In step S1020, the UE may perform first access barring check. For example, the access barring check may be performed by an RRC layer of the UE since an NAS layer of the UE detects MO data/signaling. Before the first access barring check is performed, the UE may initiate the access timer. Alternatively, after the first access barring check is performed, the UE may initiate the access timer. That is, upon checking that the access to the cell is barred according to the first access barring check, the UE may initiate the access timer.

Upon determining that the access to the cell is barred according to the first access barring check, in step S1022, the UE may perform second access barring check. The second access barring check may be performed after a predetermined barring time elapses. The second access barring check may be performed while the access timer runs.

Upon determining that the access to the cell is not barred according to the second access barring check, the UE may initiate the random access procedure, and may enter the RRC_CONNECTED state.

Upon determining that the access to the cell is barred according to the second access barring check, the UE may perform next access barring check. The next access barring check may be performed while the access timer runs. In step S1024, the UE may perform (N−1)-th access barring check. In addition, it may be determined that the access to the cell is barred according to the (N−1)-th access barring check.

At the expiry of the access timer, the UE may no longer perform the access barring check. The UE may interrupt the access barring check. Accordingly, in step S1030, the UE may transition to the RRC_IDLE state. In this case, the RRC layer of the UE may notify the NAS layer of the UE of a failure.

According to an embodiment of the present disclosure, the UE may perform the access barring check on the cell as many times as the maximum number of access attempts or while the access timer is running Therefore, for example, if a network overload or congestion is mitigated after a short time, the UE may successfully transmit data or signaling to the network without having to unnecessarily transition to the RRC_IDLE state. On the other hand, if the network overload or congestion is continued for a long time, the UE may transition to the RRC_IDLE state without having to persistently attempt the access to the cell unnecessarily. Therefore, according to an embodiment of the present disclosure, unnecessary signaling can be prevented from occurring.

Figure 11:
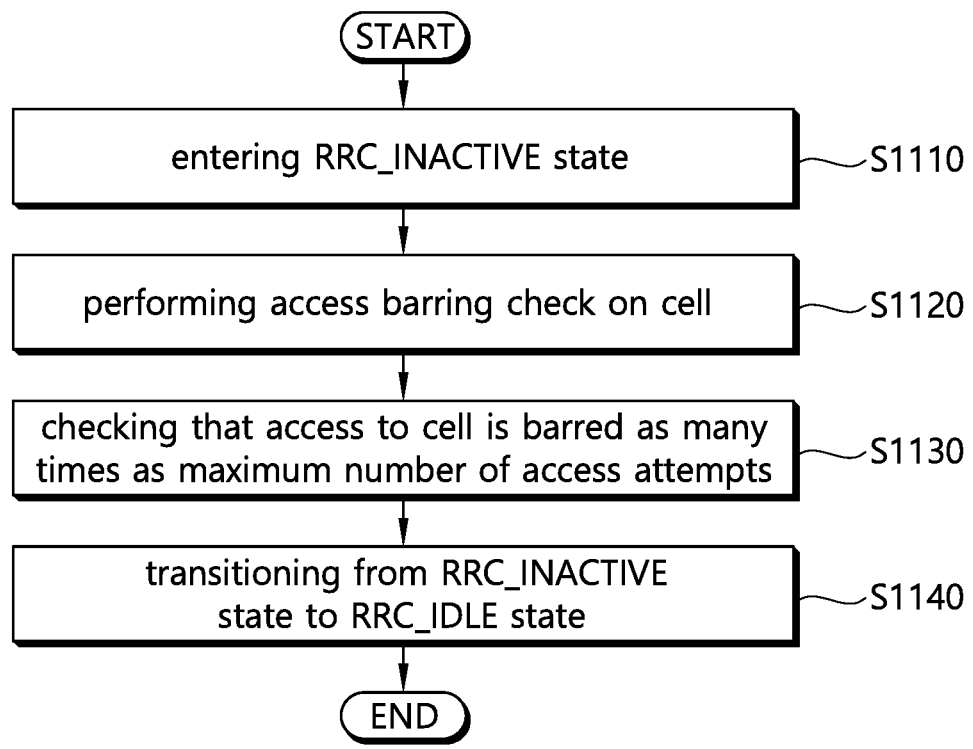
FIG. 11 is a block diagram showing a method of performing access barring check by a UE according to an embodiment of the present disclosure.

FIG. 11 is a block diagram showing a method of performing access barring check by a UE according to an embodiment of the present disclosure.

Referring to FIG. 11, in step S1110, a UE may enter an RRC_INACTIVE state.

In step S1120, the UE may perform the access barring check on a cell.

In step S1130, the UE may check that an access to the cell is barred as many times as the maximum number of access attempts.

The maximum number of access attempts may be pre-configured for the UE. Alternatively, the maximum number of access attempts may be received from the network. The maximum number of access attempts may be received from the network by being included in a system information block.

The maximum number of access attempts may be configured differently for each RRC state. The maximum number of access attempts may be configured differently for each establishment cause. The maximum number of access attempts may be configured differently for each service.

Additionally, the UE may check that an access to the cell is barred, until an access timer expires.

In step S1140, the UE may transition from an RRC_INACTIVE state to an RRC_IDLE state. If the UE checks that the access to the cell is barred as many times as the maximum number of access attempts or the UE checks that the access to the cell is barred until the access timer expires, the UE may transition from the RRC_INACTIVE state to the RRC_IDLE state.

Figure 12:
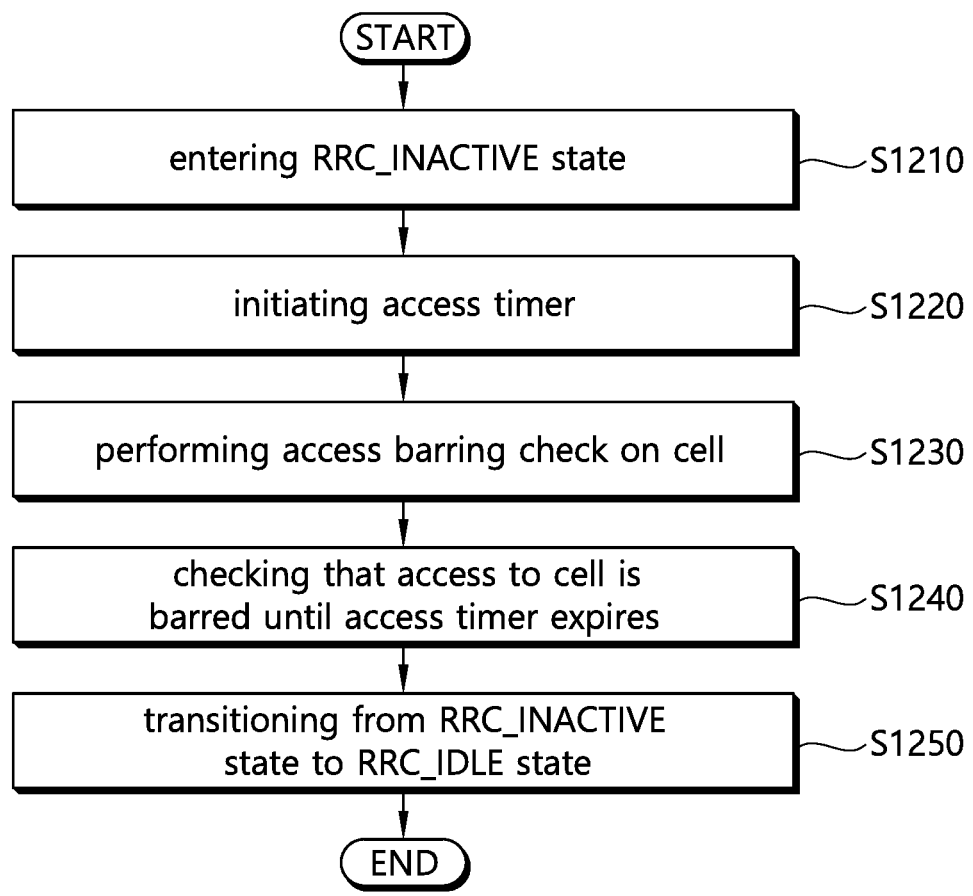
FIG. 12 is a block diagram showing a method of performing access barring check by a UE according to an embodiment of the present disclosure.

FIG. 12 is a block diagram showing a method of performing access barring check by a UE according to an embodiment of the present disclosure.

Referring to FIG. 12, in step S1210, the UE may enter an RRC_INACTIVE state.

In step S1220, the UE may initiate an access timer. The access timer may be pre-configured for the UE. Alternatively, the access timer may be received from a network. The access timer may be received from the network by being included in a system information block. The access timer may be configured differently for each RRC state.

In step S1230, the UE may perform the access barring check on the cell.

In step S1240, the UE may check that an access to the cell is barred, until the access timer expires.

In step S1250, the UE may transition from the RRC_INACTIVE state to an RRC_IDLE state.

Figure 13:
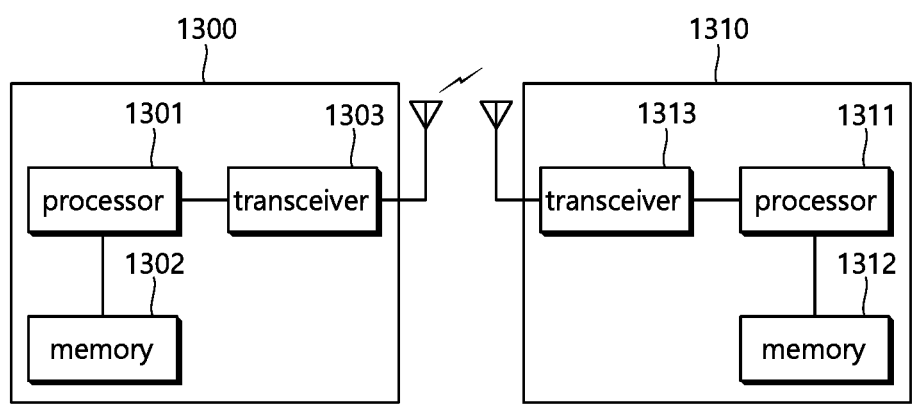
FIG. 13 is a block diagram illustrating a wireless communication system according to an embodiment of the present disclosure.

FIG. 13 is a block diagram illustrating a wireless communication system according to an embodiment of the present disclosure.

A BS (1300) includes a processor (1301), a memory (1302) and a transceiver (1303). The memory (1302) is connected to the processor (1301) and stores various information for driving the processor (1301). The transceiver (1303) is connected to the processor (1301) and transmits and/or receives radio signals. The processor (1301) implements proposed functions, processes and/or methods. In the above embodiment, an operation of the BS may be implemented by the processor (1301).

A UE (1310) includes a processor (1311), a memory (1312), and a transceiver (1313). The memory (1312) is connected to the processor (1311) and stores various information for driving the processor (1311). The transceiver (1313) is connected to the processor (1311) and transmits and/or receives radio signals. The processor (1311) implements proposed functions, processes and/or methods. In the above embodiment, an operation of the UE may be implemented by the processor (1311).

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the disclosure disclosed in the claims is not limited to the order of the steps or blocks, and each step or block can be implemented in a different order, or can be performed simultaneously with other steps or blocks. In addition, those ordinarily skilled in the art can know that the disclosure is not limited to each of the steps or blocks, and at least one different step can be added or deleted without departing from the scope and spirit of the disclosure.

The aforementioned embodiment includes various examples. It should be noted that those ordinarily skilled in the art know that all possible combinations of examples cannot be explained, and also know that various combinations can be derived from the technique of the present specification. Therefore, the protection scope of the disclosure should be determined by combining various examples described in the detailed explanation, without departing from the scope of the following claims.

What is claimed is:

1. A method of performing access barring check by a terminal in a wireless communication system, the method comprising:
receiving information related to a maximum number of access attempts, from a network;
entering an RRC_INACTIVE state;
initiating an access timer;
performing the access barring check on a cell;
checking that an access to the cell is barred, until the access timer expires; and
based on the access being barred as many times as the maximum number of access attempts while the timer is running, transitioning from the RRC_INACTIVE state to an RRC_IDLE state.

2. The method of claim 1, wherein the maximum number of access attempts is pre-configured for the terminal.

3. The method of claim 1, wherein the maximum number of access attempts is received from a network.

4. The method of claim 3, wherein the maximum number of access attempts is received from the network by being included in a system information block.

5. The method of claim 1, wherein the maximum number of access attempts is configured differently for each RRC state.

6. The method of claim 1, wherein the maximum number of access attempts is configured differently for each establishment cause.

7. The method of claim 1, wherein the maximum number of access attempts is configured differently for each service.

8. The method of claim 1, wherein the access timer is pre-configured for the terminal.

9. The method of claim 1, wherein the access timer is received from a network.

10. The method of claim 9, wherein the access timer is received from the network by being included in a system information block.

11. The method of claim 1, wherein the access timer is configured differently for each RRC state.

12. The method of claim 1, wherein the terminal communicates with at least one of a mobile terminal, a network or autonomous vehicles other than the terminal.

13. A terminal for performing access barring check in a wireless communication system, the terminal comprising:
a memory; a transceiver, and a processor coupling the memory and the transceiver; wherein the processor is configured to:
receive information related to a maximum number of access attempts, from a network;
enter an RRC_INACTIVE state;
perform the access barring check on a cell;
initiate an access timer;
perform the access barring check on a cell;
check that an access to the cell is barred, until the access timer expires; and based on the access being barred as many times as the maximum number of access attempts while the timer is running, transition from the RRC_INACTIVE state to an RRC_IDLE state.

\* \* \* \* \*